3,371,748
BRAKE FOR SIX-WHEEL TRUCKS
James B. Cunningham, Northwoods, and Richard L. Lich, Pasadena Hills, Mo., assignors to General Steel Industries, Inc., Granite City, Ill., a corporation of Delaware
Filed July 5, 1966, Ser. No. 562,833
9 Claims. (Cl. 188—47)

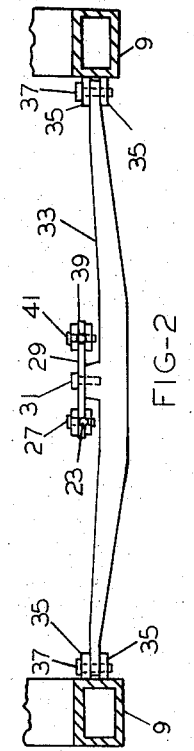
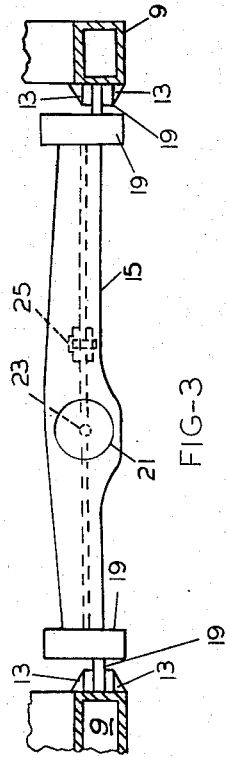
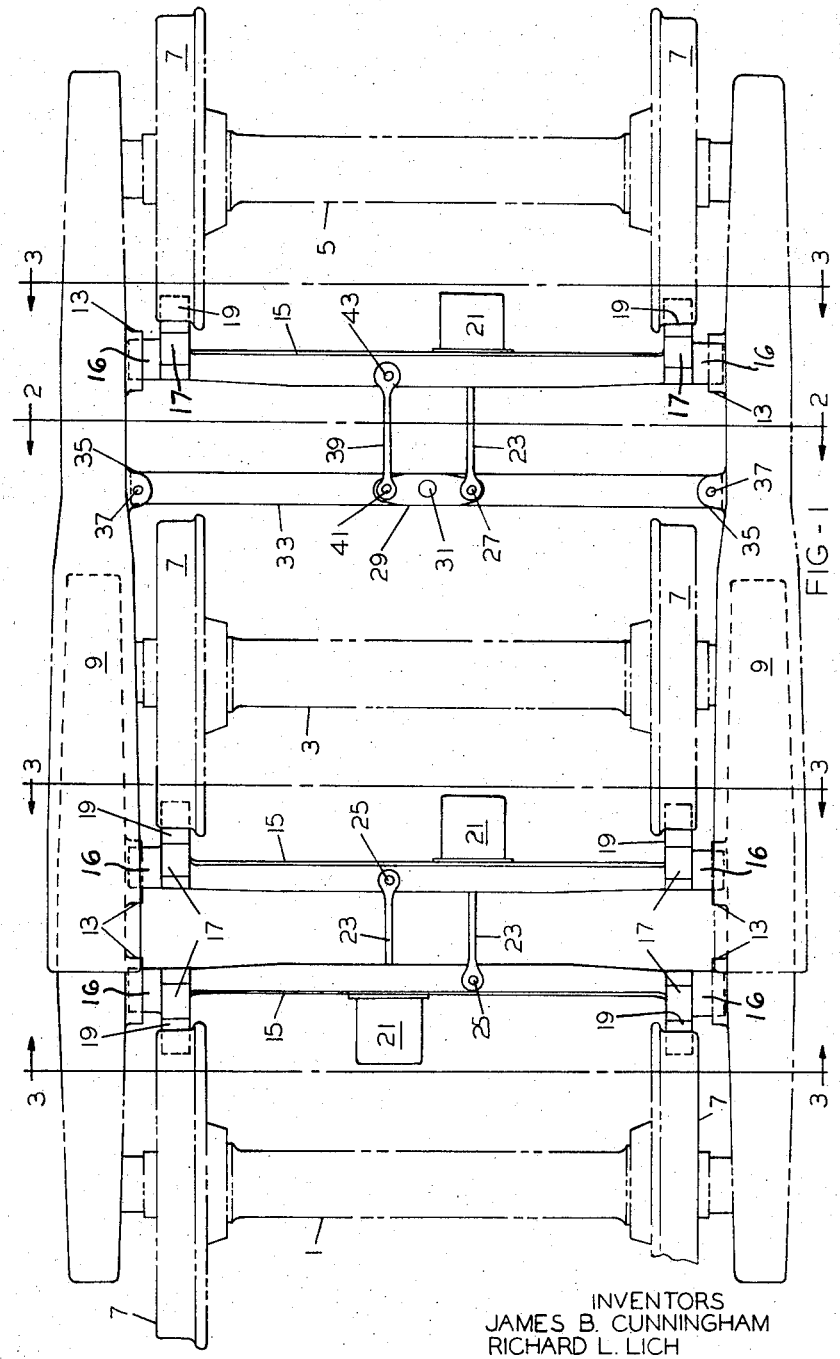

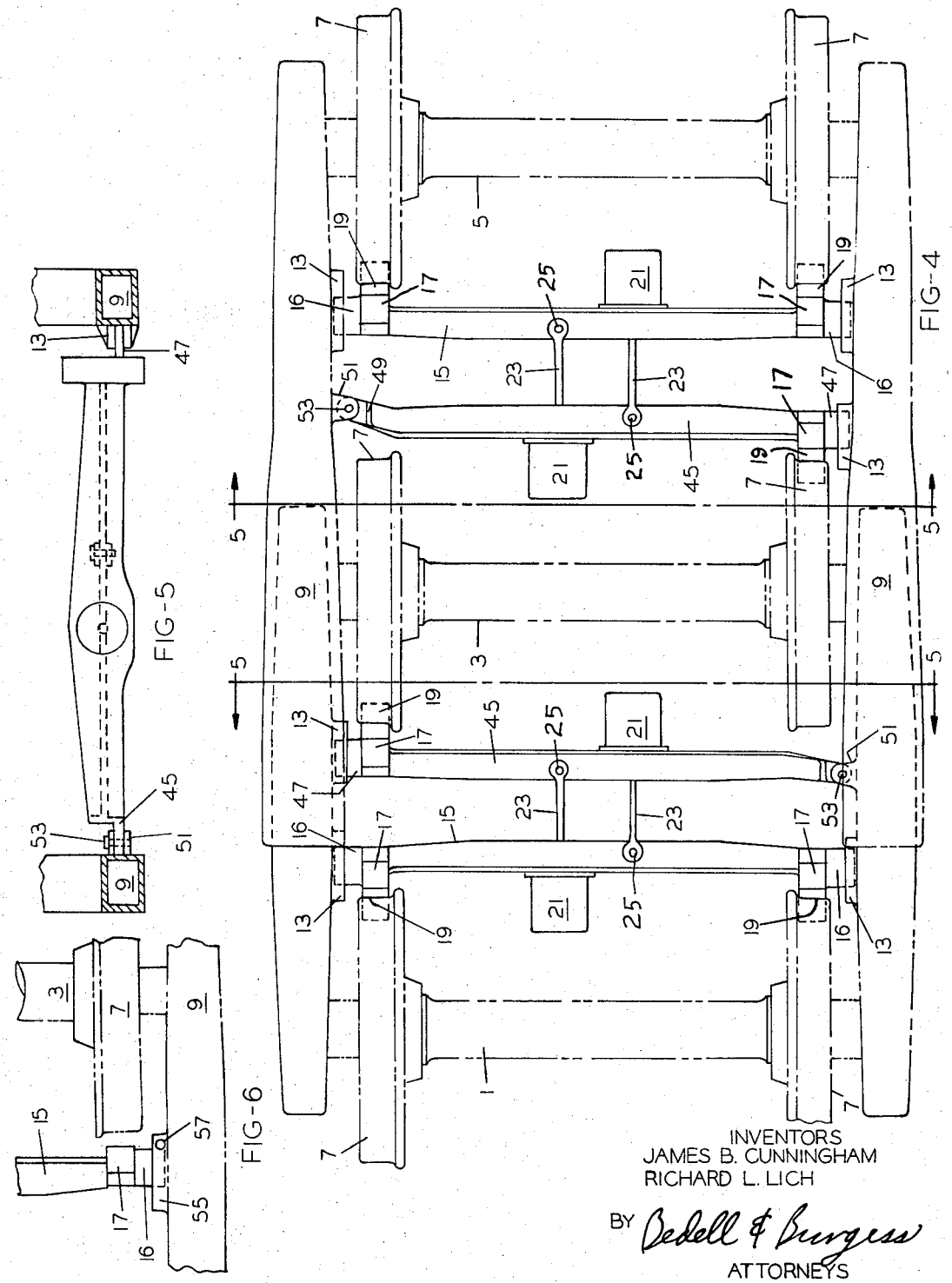

ABSTRACT OF THE DISCLOSURE

Single-shoe brake apparatus of the beam-mounted cylinder type for six-wheel railway trucks in which the end axle brake shoes are mounted on brake beams inboard of the end axles and a single pair of brake shoes for individual engagement each with one of the middle axle wheels is mounted on structure comprising a pair of beams, one of which is positioned on each side of the middle axle. In one form of the invention both of the middle axle shoes are mounted on one of the middle axle beams and the other middle axle beam is entirely unshod and is fixed at both ends to the truck side frames. In the other disclosed embodiment, each of the middle axle beams has a shoe at one end only, and the other unshod end of each middle axle beam is pivoted to the side frame.

---

The invention relates to railway brake apparatus and consists particularly in brake apparatus of the beam-mounted cylinder type for six-wheel trucks having a single shoe engageable with each wheel tread.

For four-wheel trucks, brake apparatus has been provided in which a pair of transversely-extending longitudinally spaced brake beams are positioned between the adjacent wheels, each beam mounting a brake cylinder with its pushrod connected to the other beam. Brake shoes mounted on the end portions of the beam in longitudinal alignment with the wheel tread are engageable each with one wheel tread upon the admission of fluid under pressure to the beam-mounted cylinders. This arrangement is highly suitable for a four-wheel truck, but the use of it on a six-wheel truck presents serious difficulties. If a similar system of beams, cylinders, pushrods and shoes is positioned between the middle axle and each end axle of a six wheel truck, the middle wheels will each be engageable by two shoes, providing in effect, a clasp brake on the middle wheels whereas the end axle wheels will each be engageable by a single shoe with resultant inequality in braking power on the end axle wheels as compared with the middle axle wheels.

It accordingly is a main object of the invention to provide a braking arrangement for six-wheel trucks wherein each wheel is engageable by a single brake shoe and the braking power is provided by cylinders mounted on the beams with their pushrods connected to other of the beams.

The foregoing and additional objects and advantages of the invention will be attained by the structure described hereinafter and illustrated in the accompanying drawings in which:

FIG. 1 is a top view of brake rigging embodying the invention as applied to a six-wheel freight car truck.

FIG. 2 is a transverse vertical sectional view along line 2—2 of FIG. 1.

FIG. 3 is a transverse vertical sectional view along lines 3—3 of FIG. 1.

FIG. 4 is a plan view of another form of brake rigging embodying the invention.

FIG. 5 is a transverse vertical sectional view along lines 5—5 of FIG. 4.

FIG. 6 is a fragmentary plan view of another modification.

Referring now to the drawings, the numerals 1, 3 and 5 refer respectively to an end axle, a middle axle and another end axle of a six-wheel truck each mounting adjacent its ends pairs of wheels 7. Axles 1, 3 and 5 mount at their ends, outboard of wheels 7, transversely-spaced longitudinally-extending side members 9. It will be understood that the side frame arrangement illustrated and described is for exemplary purposes only and that the subject brake apparatus may be utilized with most conventional trucks of the separate side frame and rigid frame types. Between end axle 1 and middle axle 3 side frames 9 are provided on their inner surfaces with brackets comprising pairs of generally longitudinally extending vertically spaced ribs 13 slightly inclined upwardly and outwardly and upwardly and inwardly, respectively, longitudinally of the truck i.e., to extend substantially radially with respect to the adjacent axle. A pair of transversely extending beams 15 spaced apart lengthwise of the truck is carried by the side frames 9, 9 by having their flattened end portions 16 slidably received between vertically spaced ribs 13, 13. Adjacent their end portions and in substantial alignment with the treads of wheels 7, beams 15 mount brake heads 17 and shoes 19 facing the adjacent wheels and engageable with the treads thereof upon movements of beams 15, 15 away from each other lengthwise of the truck. For effecting such lengthwise movement, each beam 15 mounts a fluid cylinder 21 slightly offset lengthwise of the beam from the center thereof and having its pushrod 23 extending lengthwise of the truck toward the opposite beam to which it is pivotally connected as at 25, so that, as fluid under pressure is admitted to cylinders 21, 21, beams 15, 15 will be urged apart lengthwise of the truck, causing their shoes 19 to frictionally engage the treads of adjacent wheels 7.

With the arrangement just described, a single brake shoe is adapted for engagement with each of wheels 7 on end axle 1 and middle axle 3. In order to provide equal braking on the wheels 7 of the other end axle 5, a similar beam 15 is slidably mounted between similar bracket ribs 13 on side frames 9 with its shoes 19 adapted for engagement with the treads of wheels 7 of end axle 5. In order to provide braking pressure on the last named beam 15 pushrod 23 of its cylinder 21 is pivotally connected at 27 to one end of an equalizer lever 29 fulcrumed at its center at 31 to a transom-like beam 33 extending transversely of the truck between vertically spaced clevis-like brackets 35 extending inwardly from side frame 9 adjacent middle axle wheels 7, beam 33 being loosely pinned at 37 between brackets 35 to permit relative vertical movements of the side frames with respect to each other while preventing substantial movement of transom 33 lengthwise of the truck. The other end of equalizer lever 29 pivotally mounts a connecting rod 39 at 41, the other end of rod 39 being pivotally connected to the last named beam 15 at 43. With this arrangement, when fluid pressure is applied to cylinder 21, its pushrod 23 will act against equalizer lever 29 the opposite end of which will act through connecting rod 39 against beam 15. This will provide equalized pressure on both ends of beam 15, causing equal frictional engagement between shoes 19 thereon with each wheel 7 on end axle 5.

Operation of the form of the invention illustrated in FIGS. 1 to 3 is as follows:

Air is simultaneously applied to cylinders 21, on the three movable beams 15. Fluid pressure in cylinders 21 on beams 15 between middle axle 3 and end axle 1 causes pushrods 23 associated with each cylinder 21 to push paired beams 15, 15 apart lengthwise of the truck, urging their brake shoes 19 against middle and end axle wheels 7 with equal force, thus applying a single brake shoe to the tread of each of the wheels of middle axle 3 and end axle 1. The fluid simultaneously admitted to cylinder 21 of brake beam 15 adjacent end axle 5 causes pushrod 23 of the last named cylinder to cause clockwise movement of equalizer lever 29 about the fulcrum 31 of the latter, connecting rod 39 thus pushing beam 15 towards end axle 5. By means of equalizer lever 29 equal pressure is assured on both ends of beam 15 and the brake shoes 19 mounted thereon, which are thereby brought into braking engagement with the treads of wheels 7 of end axle 5, no braking effect being provided on middle axle wheels 7 by the brake rigging mounted between middle axle 3 and end axle 5. Single shoe braking of each wheel of a three axle truck is thus accomplished, utilizing mainly standard components of brake systems of the beam-mounted cylinder type.

In the embodiment of the invention illustrated in FIGS. 4 and 5, beams 15, mounting cylinders 21 intermediate their ends and slightly offset from their centers are slidably supported as described above from side frames 9 in brackets 13 and have heads 17 adjacent their ends and mounting shoes 19, which are engageable with the treads of wheels 7 on end axles 1 and 5. Between middle axle 3 and end axle 1, each side frame 9 is formed adjacent one of the middle axle wheels 7 with a slide bracket 13 as described above and between middle axle 3 and the other end axle 5, the other side frame 9 is similarly formed with a bracket 13 adjacent the other middle axle wheels 7. For applying a single shoe to the tread of each of the middle axle wheels, beams 45 are provided adjacent the middle axle wheels. Each beam 45 has one flattened end 47 slidably mounted in bracket 13 on side frame 9 and mounts, adjacent the flattened end 47, a brake head 17, to which is secured brake shoe 19, one of which is engageable with the tread of each of the wheels 7 of middle axle 3. The other end of each beam 45 does not have a head and is provided with a flattened end portion 49 pivotally secured in clevis bracket 51 on adjacent side frame 9 by means of pin 53. Cylinders 21 on adjacent beams 15 and 45 are connected by pushrods 23 to the opposite beams so that upon the admission of fluid to cylinders 21, adjacent beams 15 and 45 are urged in opposite directions lengthwise of the truck causing shoes 19 on beams 15 to engage one wheel 7 of middle axle 3. With this arrangement, single shoe brake effect can be obtained on all wheels of a three-axle truck, using largely standard components of beam-mounted cylinder type brakes and thus utilizing the advantages and simplicity of this type of brake gear.

Operation of the second embodiment of the invention is as follows:

Air is simultaneously applied to all cylinders 21 on beams 15 and 45 causing pushrods 23 to push beams 15 and 45 of each pair apart lengthwise of the truck, so that shoes 19 on beams 15 frictionally engage the wheels 7 of end axles 1 and 5 and one shoe of each beam 45 engages one wheel of middle axle 3.

FIGURE 6 illustrates the manner in which the beams used in the embodiment of FIGS. 4 and 5 adjacent the middle axle may be of the standard cylinder-mounting type instead of the modified type 45. As shown in FIG. 6, brackets 55, similar to brackets 13 are formed on side frames 9 instead of clevis brackets 51 of FIGS. 5 and 6, and beams 15, each with its brake shoe 19 adjacent bracket 55 removed, are mounted in brackets 13 and 51 on both sides of middle axle 3. For preventing engagement of the adjacent unshod brake heads 19 with the middle axle wheels, a pin 57 passes vertically through the end of each bracket 55 adjacent the middle axle wheel and forms a stop spacing the adjacent end of the beam and its brakehead from the tread of the adjacent middle axle wheel. Operation is the same as with the embodiment of FIGS. 4 and 5.

The details of the brake arrangements disclosed herein may be modified substantially without departing from the spirit of the invention and the exclusive use of such modifications as come within the scope of the appended claims as contemplated.

What is claimed is:

1. Brake apparatus for six wheel railway vehicle trucks having a pair of end axles spaced apart lengthwise of the truck and a middle axle disposed intermediate said end axles and spaced lengthwise of the truck therefrom, each of said axles mounting a pair of wheels spaced apart transversely of the truck, truck framing including transversely spaced longitudinally extending side members supported from said axles, a transversely extending brake beam supported at its ends from the truck side members adjacent the wheels of each said end axle and inwardly therefrom lengthwise of the truck for movements toward and away from said end axle wheels, and mounting at its ends brake shoes engageable with the treads of said end axle wheels, structure including a pair of transversely extending beams supported from said frame side members respectively between said middle axle wheels and the wheels of the opposite end axles, a single pair of brake shoes carried by said structure for movement lengthwise of the truck into and out of engagement with said middle axle wheels, the shoes of said single pair being mounted on transversely opposite beam ends of said structure whereby only a single shoe of said single pair is engageable with each of said middle axle wheels, the unshod beam ends of said structure being held against movement lengthwise of the truck framing toward said middle axle, cylinders mounted on said end wheel brake beams with their pistons extending lengthwise of the truck and connected to the adjacent beam of said structure whereby to urge adjacent beams intermediate the middle axle and end axles apart lengthwise of the truck upon the admission of fluid to said cylinders thereby causing one brake shoe to engage each of said wheels.

2. Brake apparatus according to claim 1 in which said truck side members are provided with inwardly extending brackets forming slots lengthwise of the truck and slidably receiving the extremities of said end axle brake beams and of parts of said structure.

3. Brake apparatus according to claim 1 in which one of said beams adjacent the middle axle wheels is similar to said end brake beams, having both of its ends movable lengthwise of the truck and mounting shoes at both ends engageable with the treads of both middle axle wheels, said beam on the other side of said middle axle wheels being supported at its ends from said truck side members and fixed against substantial movement lengthwise thereof, an equalizer lever fulcrumed at its center on said last-named beam, the piston of said adjacent end axle brake beam cylinder being connected to one end of said equalizer lever, the other end of said equalizer lever being connected by a rod extending lengthwise of the truck to the adjacent end brake beam, said piston and said rod being spaced apart transversely of the truck.

4. Brake apparatus according to claim 3 in which said truck side members are provided with inwardly extending brackets forming slots lengthwise of the truck and slidably receiving the extremities of both end axle brake beams and said one beam adjacent said middle axle wheels, inwardly extending and clevis-like brackets supporting said other beam adjacent the middle axle.

5. Brake apparatus according to claim 1 in which one of said beams adjacent the middle axle wheels is similar to said end axle beams, having both of its ends movable lengthwise of the truck and mounting at both ends shoes engageable with the treads of both middle axle wheels, means limiting movement of the beam on the other side of said middle axle wheels toward the middle axle, and means connecting the piston of the adjacent end axle brake beam cylinder to said last-named middle axle beam.

6. Brake apparatus according to claim 1 in which each of said beams adjacent said middle axle wheels mounts a shoe at one end only, said one end being supported from the adjacent side frame for movement of said shoe into engagement with the adjacent middle axle wheel tread, means limiting movement of the other end of each of said last-named beams toward said middle axle wheels, the shoe-mounting ends of said last-named beams being oppositely disposed transversely of the truck whereby the shoes thereon engage opposite middle axle wheels.

7. Brake apparatus according to claim 6 in which said movement-limiting means comprises a vertical axis pivotal connection of said other end of each of said last-named beams to the adjacent truck side member.

8. Brake apparatus according to claim 7 in which said truck side members are provided with inwardly extending brackets forming slots lengthwise of the truck and slidably receiving both extremities of said end axle beams and the extremities of the shod ends only of said middle axle beams.

9. Brake apparatus according to claim 6 in which said truck side members are provided with inwardly extending brackets forming slots lengthwise of the truck and slidably receiving the extremities of all said beams, said movement-limiting means comprising stops in said slotted brackets between the extremities of the unshod ends of said last-named beams and the adjacent middle axle wheels.

References Cited
UNITED STATES PATENTS

| | | | |
|---|---|---|---|
| 3,101,814 | 8/1963 | Newell | 188—52 X |
| 3,319,582 | 5/1967 | Kneiling | 188—33 X |

DUANE A. REGER, *Primary Examiner.*